(12) United States Patent
Dams

(10) Patent No.: US 7,536,602 B2
(45) Date of Patent: May 19, 2009

(54) METHOD AND APPARATUS FOR EVALUATING PATHS IN A STATE MACHINE

(75) Inventor: Dennis R. Dams, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 524 days.

(21) Appl. No.: 11/356,668

(22) Filed: Feb. 17, 2006

(65) Prior Publication Data

US 2007/0220346 A1 Sep. 20, 2007

(51) Int. Cl.
*G06F 11/00* (2006.01)

(52) U.S. Cl. .......................... 714/38; 717/124; 717/131; 717/132

(58) Field of Classification Search .................. 714/38, 714/37; 717/124, 131, 132
See application file for complete search history.

(56) References Cited

U.S. PATENT DOCUMENTS

| 5,394,347 | A * | 2/1995 | Kita et al. .................. 703/2 |
| 5,790,778 | A * | 8/1998 | Bush et al. .................. 714/38 |
| 5,854,924 | A * | 12/1998 | Rickel et al. ............... 717/132 |
| 6,059,837 | A * | 5/2000 | Kukula et al. ................ 703/27 |
| 6,311,293 | B1 * | 10/2001 | Kurshan et al. ............. 714/37 |
| 6,694,290 | B1 * | 2/2004 | Apfelbaum et al. .......... 703/22 |
| 7,089,542 | B2 * | 8/2006 | Brand et al. ................ 717/143 |
| 7,092,858 | B1 * | 8/2006 | Kukula et al. ................ 703/2 |
| 7,346,486 | B2 * | 3/2008 | Ivancic et al. .............. 703/22 |
| 2005/0060691 | A1 * | 3/2005 | Das et al. .................... 717/132 |
| 2007/0016894 | A1 * | 1/2007 | Sreedhar ..................... 717/131 |
| 2007/0234305 | A1 * | 10/2007 | Mishra et al. ............... 717/128 |
| 2008/0005619 | A1 * | 1/2008 | Arons et al. ................. 714/38 |
| 2008/0034353 | A1 * | 2/2008 | Rajamani et al. ........... 717/139 |
| 2008/0126063 | A1 * | 5/2008 | Beer et al. ................... 703/14 |

OTHER PUBLICATIONS

D. Brand, Error Detection by Data Flow Analysis Restricted to Executable Paths, IBM T.J. Watson Research Center, May 24, 1999.*
Brand, Daniel, "A Software Falsifier", International Symposium on Software Reliability Engineering, pp. 174-185, Oct. 2000.
Dams, et al., "Orion: High-Precision Methods for Static Error Analysis of C and C++ Programs", downloadable from http://cm.bell-labs.com/who/dennis/Papers/dn04c.pdf, 2006.
J. Geldenhuys, "State Caching Reconsidered," SPIN, 23-38 (2004).

* cited by examiner

*Primary Examiner*—Marc Duncan

(57) ABSTRACT

Methods and apparatus are provided for exploring paths through a graph representation of a program or another entity. According to one aspect of the invention, at least one property of a state machine, such as a graph representing a software program, is evaluated. One or more paths in the state machine are evaluated using a state exploration algorithm, wherein the state exploration algorithm maintains a stack data structure representing a current path being processed from an entry state to a current state and a visited state cache indicating zero or more states that have been evaluated. When a state satisfies at least one property, such as having an error, each of the states in the path are removed from the visited states cache if the path satisfies one or more predefined criteria. The one or more predefined criteria may comprise a feasibility of the path.

20 Claims, 2 Drawing Sheets

```
Stack := [];
ExploredPaths := ∅;

path_search(s) =
  if s is in Stack then skip
  else
    push s on Stack;
    add Stack to ExploredPaths;
    i := 0;
    while i < nsuccs(s) do
      path_search(succ_i(s));
      i := i + 1
    od;
    pop Stack
  fi
```

```
01   Black := ∅;
02   Stack := [];
03   Output := ∅;

06   feas_path_search(s) =

08     if s ∈ Black or s is in Stack then skip
09     else
10       add s to Black;
11       push s on Stack;

13       if s ∈ E then
14         if feasible(Stack) then add Stack to Output
15         else delete set_of(Stack) from Black
16         fi
17       fi;
18       i := 0;
19       while i < nsuccs(s) do (loop invariant: I1')
20         feas_path_search(succ_i(s));
21         i := i + 1
22         { I1' }
23       od;

25       pop Stack
26     fi
```

METHOD AND APPARATUS FOR EVALUATING PATHS IN A STATE MACHINE

STATEMENT OF GOVERNMENT RIGHTS

This invention was made with Government support under Contract CCR-0341658 awarded by NSF. The Government has certain rights in this invention.

FIELD OF THE INVENTION

The present invention relates to the evaluation of software programs and, more particularly, to methods and apparatus for evaluating paths in software programs.

BACKGROUND OF THE INVENTION

The design and testing of software is often an expensive and time-consuming process. Tools based on model checking with automaton specifications have been very effective at finding important bugs such as buffer overflows, memory safety violations, and violations of locking and security policies. In general, a sound program analysis tool will not miss any errors. If the tool reports no potential problems, then the analyzed program is said to be error-free (for the class of errors that the tool checks). The correctness problem, however, is undecidable (i.e., the problem cannot be solved precisely). Thus, problems reported by sound tools may contain false alarms. The challenge in developing a precise tool is to keep the false alarm ratio low.

Static program analysis tools may reduce the false alarm ratio by performing a two-phase analysis. In a first phase, a quick, approximate analysis of the program may be performed to detect potential errors. A state exploration algorithm, such as depth-first search (DFS), is typically employed to visit all reachable states in a control flow graph. Each visited state can be evaluated to determine if the state satisfies one or more predefined correctness properties. Typically, when an error state is encountered, a stack data structure maintained by the DFS algorithm will contain a path from the entry state to the error state.

In a second phase, the precision can be improved by subjecting the stack path to a feasibility check. Each potential error trace may be examined in detail, applying theorem proving techniques to check whether the trace is feasible, i.e., whether it is possible for a real program execution to follow the trace all the way to the error. If the feasibility test determines that the trace is feasible, the problem is reported, and if it determines that the trace is infeasible, the report is suppressed. For a discussion of such feasibility checks, see, for example, D. Dams and K. Namjoshi, "Orion: High Precision Methods for Static Error Analysis of C and C++ Programs," downloadable from http://cm.bell-labs.com/who/dennis/Papers/dn04c.pdf or D. Brand, "A Software Falsifier," Int'l Symp. on Software Reliability Engineering, 174-185 (October, 2000), each incorporated by reference herein.

While such feasibility checks may increase the precision of the error checking, one or more errors may get masked. In particular, if a path to an error state is infeasible (and hence not reported), then another subsequently processed feasible path to the same state may be missed by the search. Generally, a DFS algorithm will backtrack when it encounters a state that has been visited before. Thus, by adding a feasibility check, DFS may become an unsound method for detecting reachable errors. It has been found that DFS is an algorithm for exploring states of a graph, not paths through the graph.

State Space Caching, a generalization of the DFS algorithm, is another well-known technique for exploring reachable states of a graph in which only a subset of the visited states is kept in memory (cached). A State Space Caching algorithm may enumerate the (non-looping) paths in a graph, by using a cache of size zero. J. Geldenhuys, "State Caching Reconsidered," SPIN, 23-38 (2004) provides an overview of various criteria that have been proposed for the selection of states to be kept in the cache. For example, when the goal of the algorithm is to explore states, random replacement of cached states is a reasonable strategy.

A need exists for improved methods and apparatus for exploring paths through a graph representation of a program or another entity.

SUMMARY OF THE INVENTION

Generally, methods and apparatus are provided for exploring paths through a graph representation of a program or another entity. According to one aspect of the invention, at least one property of a state machine, such as a graph representing a software program, is evaluated. One or more paths in the state machine are evaluated using a state exploration algorithm, wherein the state exploration algorithm maintains a stack data structure representing a current path being processed from an entry state to a current state and a visited state cache indicating one or more states that have been evaluated. When a state satisfies at least one property, such as having an error, each of the states in the path are removed from the visited states cache if the path satisfies one or more predefined criteria. The one or more predefined criteria may comprise a feasibility of the path.

The state exploration algorithm can be, for example, a depth-first search (DFS). The state exploration algorithm will backtrack to a new path if a state being evaluated is already indicated in the stack data structure or in the visited state cache.

A more complete understanding of the present invention, as well as further features and advantages of the present invention, will be obtained by reference to the following detailed description and drawings.

DETAILED DESCRIPTION

The present invention provides improved methods and apparatus for exploring reachable states of a graph that avoid the above described problems associated with conventional techniques. In one exemplary implementation, the disclosed path-exploration techniques can be embodied using a conventional DFS algorithm with a feasibility check, such as those described in D. Dams and K. Namjoshi, "Orion: High Precision Methods for Static Error Analysis of C and C++ Programs," referenced above, as modified herein to provide the features and functions of the present invention. States are stored in a cache of visited states when they are first visited by the DFS algorithm. When an error state is encountered and the path to the error state cannot be shown to be feasible, all states on the path are deleted from the cache of visited states. Otherwise, they are left in the cache of visited states.

It is noted that feasibility is an exemplary property of a path, and the present invention can be extended to other path properties as well, as would be apparent to a person of ordinary skill in the art. In addition, while the present invention is illustrated in the context of a control flow graph representing a software program with designated error states, the present invention can be applied to any state machine, and any type of designated states therein, such as networks or communicating elements of a concurrent system, as would be apparent to a person of ordinary skill.

Figures 1, 2:
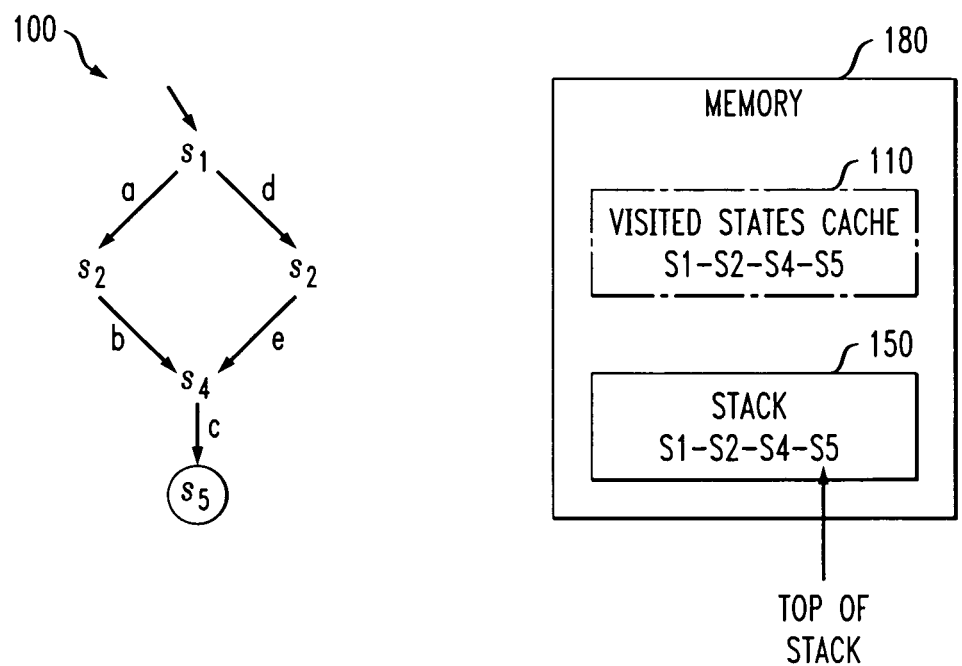
FIG. 1 illustrates an exemplary graph on which the present invention can operate.
FIG. 2 illustrates pseudo-code for an exemplary path-exploration algorithm based on State Space Caching.

As previously indicated, a common state exploration algorithm such as DFS can be used to find whether an error state is reachable from some initial state. FIG. 1 illustrates an exemplary graph 100 on which the present invention can operate. As shown in FIG. 1, the graph 100 is comprised of states $s_1$, $s_2$, $s_3$, $s_4$, $s_5$ and transitions a, b, c, d, e. The state $s_1$ is the unique initial state (indicated by an arrow without label), and $s_5$ is an error state (indicated by the circle around it). The DFS starts with only state $s_1$ on its stack. Assume that the DFS first selects successor state $s_2$ for exploration. The DFS will then first reach error state $s_5$ along the path $s_1$, $s_2$, $s_4$, $s_5$. Assuming this is an infeasible path, the algorithm backtracks to state $s_1$, where it then selects $s_3$ for exploration. From $s_3$, state $s_4$ is reached, which has already been visited, so the DFS backtracks there. The path to $s_5$ via state $s_3$, which may be feasible, is not found using conventional DFS techniques. As indicated above, the DFS explores all states, but not necessarily all paths through a graph.

As shown in FIG. 1, as the DFS processes the graph 100, one or more data structures stored in memory 180 are maintained, in a known manner. In particular, the DFS typically maintains a stack 150 and a cache 110 of visited states. Generally, the stack 150 contains a representation of the current path being processed, from the entry state to a current state. As the DFS visits the reachable states in the graph 100, the data structures 110, 150 are maintained in a conventional manner. The data structures 110, 150 shown in FIG. 1 are populated with data for a time after the state $s_5$ has been processed and it is determined that there are no states below $s_5$ to be processed (no successor states to state $s_5$). It is noted that data elements are only taken from the top of the stack 150, and the elements in the stack 150 are ordered. The path evaluation routine will eventually backtrack to state $s_1$ and then resume forward with state $s_3$ along a new path.

FIG. 2 illustrates pseudo-code for an exemplary path-exploration algorithm 200 based on State Space Caching. The path-exploration algorithm 200 does not employ a visited state cache 110 (at the cost of revisiting previously visited states) or a feasibility analysis. Generally, the path-exploration algorithm 200 alters the DFS search so as to backtrack only when a state is encountered that is already on the stack. In other words, the path-exploration algorithm 200 does not remember any state that was visited, by not maintaining the visited state cache 110 at all.

As shown in FIG. 2, the path-exploration algorithm 200 collects all paths starting from an initial state s in the set ExploredPaths. It is noted that the path-exploration algorithm 200 only backtracks when the encountered state is already on the stack. The function nsuccs returns the number of successors of a given state (assumed to be ordered). When nsuccs(s) equals k for some state s, then its successors are $succ_0(s)$ through $succ_{k-1}(s)$.

Figures 3, 4:
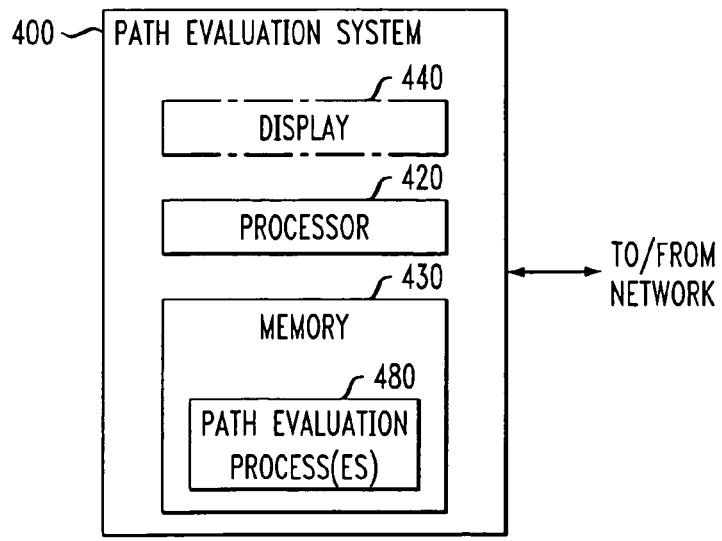
FIG. 3 illustrates pseudo-code for an exemplary path-exploration algorithm according to the invention.
FIG. 4 is a block diagram of an exemplary system that can implement the present invention.

According to one aspect of the invention, a path-exploration algorithm 300 is provided that employs a visited state cache 110, as well as a feasibility analysis. FIG. 3 illustrates pseudo-code for an exemplary path-exploration algorithm 300 according to one embodiment of the invention. Generally, if an error is detected by the path-exploration algorithm 300, it is determined whether the path to the error state is a feasible path. In addition, upon a determination that a path to an error state is an infeasible path, the path-exploration algorithm 300 removes all states from the visited state cache 110 (i.e., the set Black, in the algorithm of FIG. 3) that are part of the infeasible path. In this manner, the path-exploration algorithm 300 will not remember that a state removed from the visited state cache 110 was previously visited.

On the first visit, when it is determined that a path to an error state is an infeasible path, the detected error will not be reported as a result of the infeasibility. On a subsequent visit to a previously visited state, the alternate path may be a feasible path and thus the error may be reportable.

As discussed hereinafter, the path-exploration algorithm 300 can be viewed as a variation of a conventional DFS algorithm, in which the stack states are removed from the cache of visited states 110 whenever a path to an error state cannot be shown to be feasible (line 15). As shown in FIG. 3, the set Black is the visited state cache 110. The stack 150 is initialized at line 2 to an empty sequence. The sets Black and Output are initialized at lines 1 and 3, respectively.

At line 8, if the state s belongs to the set 110 of visited states, or is in the stack 150, then the search backtracks (backtracking criterion). Otherwise, the state s is added to the cache 110 of visited states at line 10 and pushed onto the top of the stack 150 at line 11.

If the state s is determined to have an error at line 13, where E is the set of error states, a test is performed at line 14 to determine if the path defined by the stack 150 is feasible, and if so, the error is reported.

If, however, it is determined at line 15 that the path defined by the stack 150 is not feasible, then the states associated with the path defined by the stack 150 are deleted from the set 110 of visited states (Black) at line 15, in accordance with the present invention. The path-exploration algorithm 300 iterates during lines 19-23 over the successor states of state s.

In general, the present invention can be considered to provide a policy for maintaining the set 110 of visited states, with the goal of identifying feasible paths leading to error states, or, as noted before, any other property of paths instead of feasibility, and any other property of states instead of being an error state.

In general, the algorithms presented in FIGS. 2 and 3 will only find non-looping paths having an error. When considering paths with loops, the algorithm may not terminate. This may be avoided by replacing line 8 in FIG. 3 with the following:

if s ∈ Black then skip

This results in an algorithm that may not terminate.

FIG. 4 is a block diagram of a path evaluation system 400 that can implement the processes of the present invention. As shown in FIG. 4, memory 430 configures the processor 420 to implement the path evaluation methods, steps, and functions disclosed herein (collectively, shown as 480 in FIG. 4). The memory 430 could be distributed or local and the processor 420 could be distributed or singular. The memory 430 could be implemented as an electrical, magnetic or optical memory, or any combination of these or other types of storage devices. It should be noted that each distributed processor that makes up processor 420 generally contains its own addressable memory space. It should also be noted that some or all of computer system 400 can be incorporated into an application-specific or general-use integrated circuit.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

I claim:

1. A method for evaluating at least one property of a state machine, said method comprising the steps of:
   evaluating one or more paths in said state machine using a state exploration algorithm, wherein said state exploration algorithm maintains a stack data structure representing a current path being processed from an entry state to a current state and a visited state cache indicating zero or more states that have been evaluated; and
   determining whether said path to said current state satisfies one or more predefined criteria when a state satisfies said at least one property; and
   removing each of the states in said path from said visited states cache if said path does not satisfy said one or more predefined criteria.

2. The method of claim 1, wherein said state exploration algorithm is a depth-first search (DFS).

3. The method of claim 1, wherein said state machine is a graph representing a software program.

4. The method of claim 1, wherein said at least one property comprises said state being an error state.

5. The method of claim 1, wherein said one or more predefined criteria comprises a feasibility of said path.

6. The method of claim 1, further comprising the step of determining whether a path to an error state is a feasible path.

7. The method of claim 1, wherein said state exploration algorithm backtracks to a new path if a state being evaluated is already indicated in said stack data structure or in said visited state cache.

8. The method of claim 1, wherein said state exploration algorithm only backtracks to a new path if a state being evaluated is already indicated in said visited state cache.

9. An apparatus for evaluating at least one property of a state machine, the apparatus comprising:
   a memory; and
   at least one processor, coupled to the memory, operative to:
   evaluate one or more paths in said state machine using a state exploration algorithm, wherein said state exploration algorithm maintains a stack data structure representing a current path being processed from an entry state to a current state and a visited state cache indicating zero or more states that have been evaluated; and
   determine whether said path to said current state satisfies one or more predefined criteria when a state does not satisfy said at least one property; and
   remove each of the states in said path from said visited states cache if said path satisfies said one or more predefined criteria.

10. The apparatus of claim 9, wherein said state exploration algorithm is a depth-first search (DFS).

11. The apparatus of claim 9, wherein said state machine is a graph representing a software program.

12. The apparatus of claim 9, wherein said at least one property comprises said state being an error state.

13. The apparatus of claim 9, wherein said one or more predefined criteria comprise a feasibility of said path.

14. The apparatus of claim 9, wherein said processor is further configured to determine whether a path to an error state is a feasible path.

15. The apparatus of claim 9, wherein said state exploration algorithm backtracks to a new path if a state being evaluated is already indicated in said stack data structure or in said visited state cache.

16. The apparatus of claim 9, wherein said state exploration algorithm only backtracks to a new path if a state being evaluated is already indicated in said visited state cache.

17. An article of manufacture for evaluating at least one property of a state machine, comprising a computer readable storage medium containing one or more programs which when executed implement the steps of:
   evaluating one or more paths in said state machine using a state exploration algorithm, wherein said state exploration algorithm maintains a stack data structure representing a current path being processed from an entry state to a current state and a visited state cache indicating zero or more states that have been evaluated; and
   determining whether said path to said current state satisfies one or more predefined criteria when a state does not satisfy said at least one property; and
   removing each of the states in said path from said visited states cache if said path satisfies said one or more predefined criteria.

18. The article of manufacture of claim 17, wherein said state exploration algorithm is a depth-first search (DFS).

19. The article of manufacture of claim 17, wherein said state machine is a graph representing a software program.

20. The article of manufacture of claim 17, wherein said one or more predefined criteria comprises a feasibility of said path.

* * * * *